US012602430B2

(12) United States Patent
Lee

(10) Patent No.: US 12,602,430 B2
(45) Date of Patent: Apr. 14, 2026

(54) METHOD FOR CONSTRUCTING POSITIONING DB USING CLUSTERING OF LOCAL FEATURES AND APPARATUS FOR CONSTRUCTING POSITIONING DB

(71) Applicant: SK Telecom Co., Ltd., Seoul (KR)

(72) Inventor: Taekyeong Lee, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 945 days.

(21) Appl. No.: 17/852,037

(22) Filed: Jun. 28, 2022

(65) Prior Publication Data

US 2022/0414150 A1 Dec. 29, 2022

(30) Foreign Application Priority Data

Jun. 28, 2021 (KR) ........................ 10-2021-0084068

(51) Int. Cl.
| | |
|---|---|
| *G06F 16/75* | (2019.01) |
| *G06F 16/732* | (2019.01) |
| *G06T 19/00* | (2011.01) |
| *G06V 10/44* | (2022.01) |
| *G06V 10/762* | (2022.01) |
| *G06V 20/40* | (2022.01) |
| *G06V 20/64* | (2022.01) |

(52) U.S. Cl.
CPC .......... *G06F 16/75* (2019.01); *G06F 16/7328* (2019.01); *G06T 19/003* (2013.01); *G06V 10/44* (2022.01); *G06V 10/762* (2022.01); *G06V 20/46* (2022.01); *G06V 20/647* (2022.01)

(58) Field of Classification Search
CPC ... G06F 16/75; G06F 16/7328; G06V 10/762; G06V 20/46; G06V 10/44; G06V 20/647; G06T 19/003
See application file for complete search history.

(56) References Cited

U.S. PATENT DOCUMENTS

| | | | |
|---|---|---|---|
| 2012/0121131 A1* | 5/2012 | Kim | ....................... G06V 20/10 |
| | | | 382/103 |
| 2014/0363048 A1 | 12/2014 | Vrcelj et al. | |
| 2018/0322130 A1* | 11/2018 | Spisic | ................. G06F 16/2246 |

(Continued)

FOREIGN PATENT DOCUMENTS

| | | |
|---|---|---|
| CN | 104239566 A | 12/2014 |
| CN | 109934111 A | 6/2019 |
| WO | WO 2014002554 A1 | 1/2014 |

*Primary Examiner* — Syed Haider

(74) *Attorney, Agent, or Firm* — WTA IP Law P.C.

(57) ABSTRACT

A method of constructing a positioning DB performed by an apparatus for constructing the positioning DB, may comprise: extracting a plurality of local features from a plurality of keyframes capturing a predetermined region; determining an individual 3D keypoint including information on a 3-dimensional position of each of the plurality of local features; clustering the plurality of local features into a plurality of clusters based on the individual 3D keypoint; determining a representative position information representatively indicating a position of each of the plurality of clusters by using the individual 3D keypoint of the local feature included in each of the plurality of clusters; and storing, for each of the plurality of keyframes, an cluster identification for identifying each of the plurality of clusters and the representative position information of each of the plurality of clusters in the positioning DB.

18 Claims, 9 Drawing Sheets

(56) References Cited

U.S. PATENT DOCUMENTS

| | | | |
|---|---|---|---|
| 2019/0095465 A1* | 3/2019 | Zhai | G06V 10/761 |
| 2021/0149924 A1* | 5/2021 | Yan | G06F 16/2282 |
| 2024/0102826 A1* | 3/2024 | Cao | G06T 9/00 |

* cited by examiner

Figure 1:
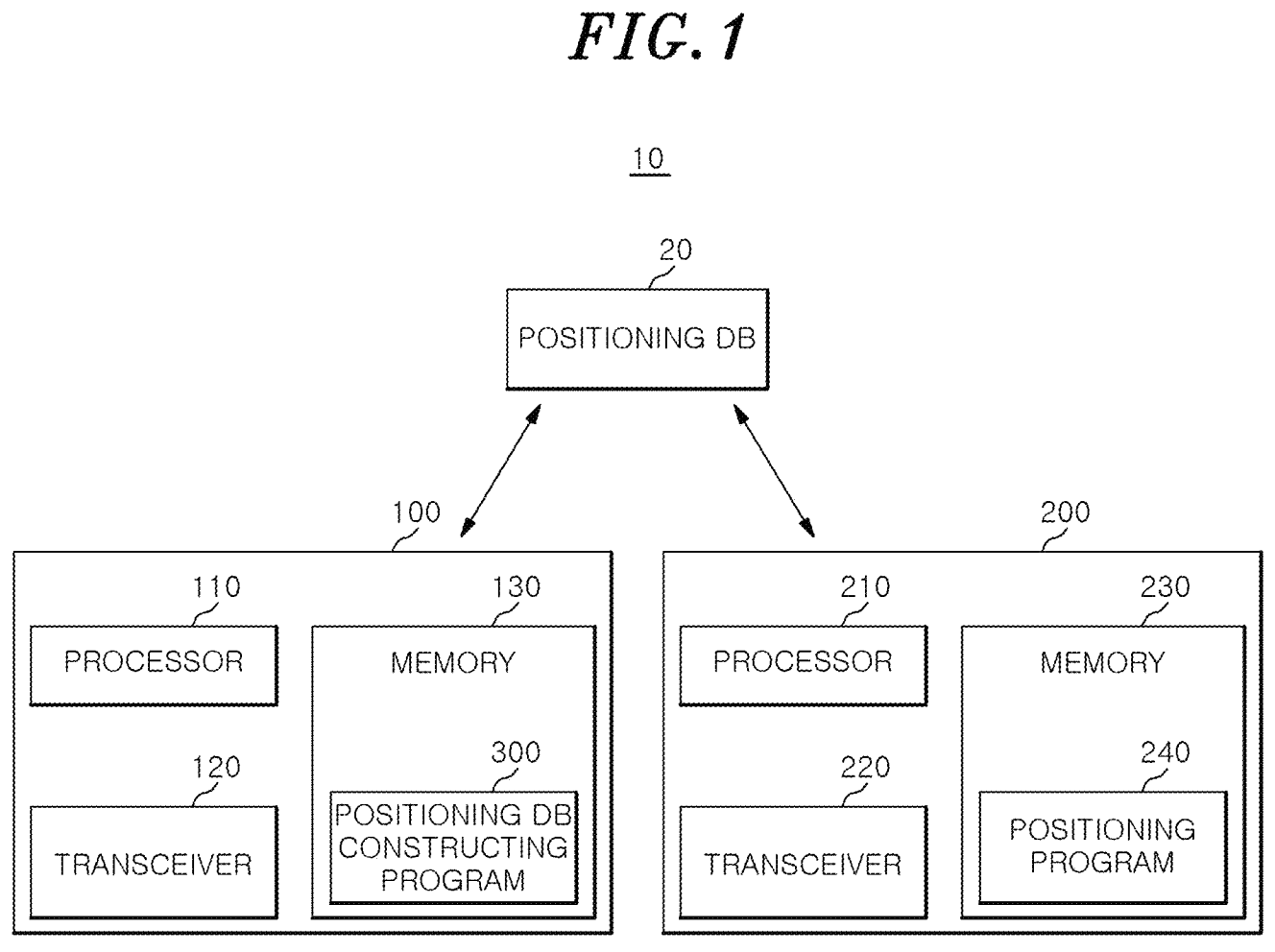

20 — POSITIONING DB

100

110 — PROCESSOR

120 — TRANSCEIVER

130 — MEMORY

300 — POSITIONING DB CONSTRUCTING PROGRAM

200

210 — PROCESSOR

220 — TRANSCEIVER

230 — MEMORY

240 — POSITIONING PROGRAM

| CLUSTER ID | REPRESENTATIVE 3D KEYPOINT | REPRESENTATIVE DESCRIPTOR |
|---|---|---|
| FIRST CLUSTER ID | FIRST REPRESENTATIVE 3D KEYPOINT | FIRST REPRESENTATIVE DESCRIPTOR |
| SECOND CLUSTER ID | SECOND REPRESENTATIVE 3D KEYPOINT | SECOND REPRESENTATIVE DESCRIPTOR |
| THIRD CLUSTER ID | THIRD REPRESENTATIVE 3D KEYPOINT | THIRD REPRESENTATIVE DESCRIPTOR |
| FOURTH CLUSTER ID | FOURTH REPRESENTATIVE 3D KEYPOINT | FOURTH REPRESENTATIVE DESCRIPTOR |
| FIFTH CLUSTER ID | FIFTH REPRESENTATIVE 3D KEYPOINT | FIFTH REPRESENTATIVE DESCRIPTOR |
| SIXTH CLUSTER ID | SIXTH REPRESENTATIVE 3D KEYPOINT | SIXTH REPRESENTATIVE DESCRIPTOR |

| SECOND GLOBAL FEATURE |
|---|
| FIRST CLUSTER ID |
| THIRD CLUSTER ID |
| SIXTH CLUSTER ID |

*FIG.6*

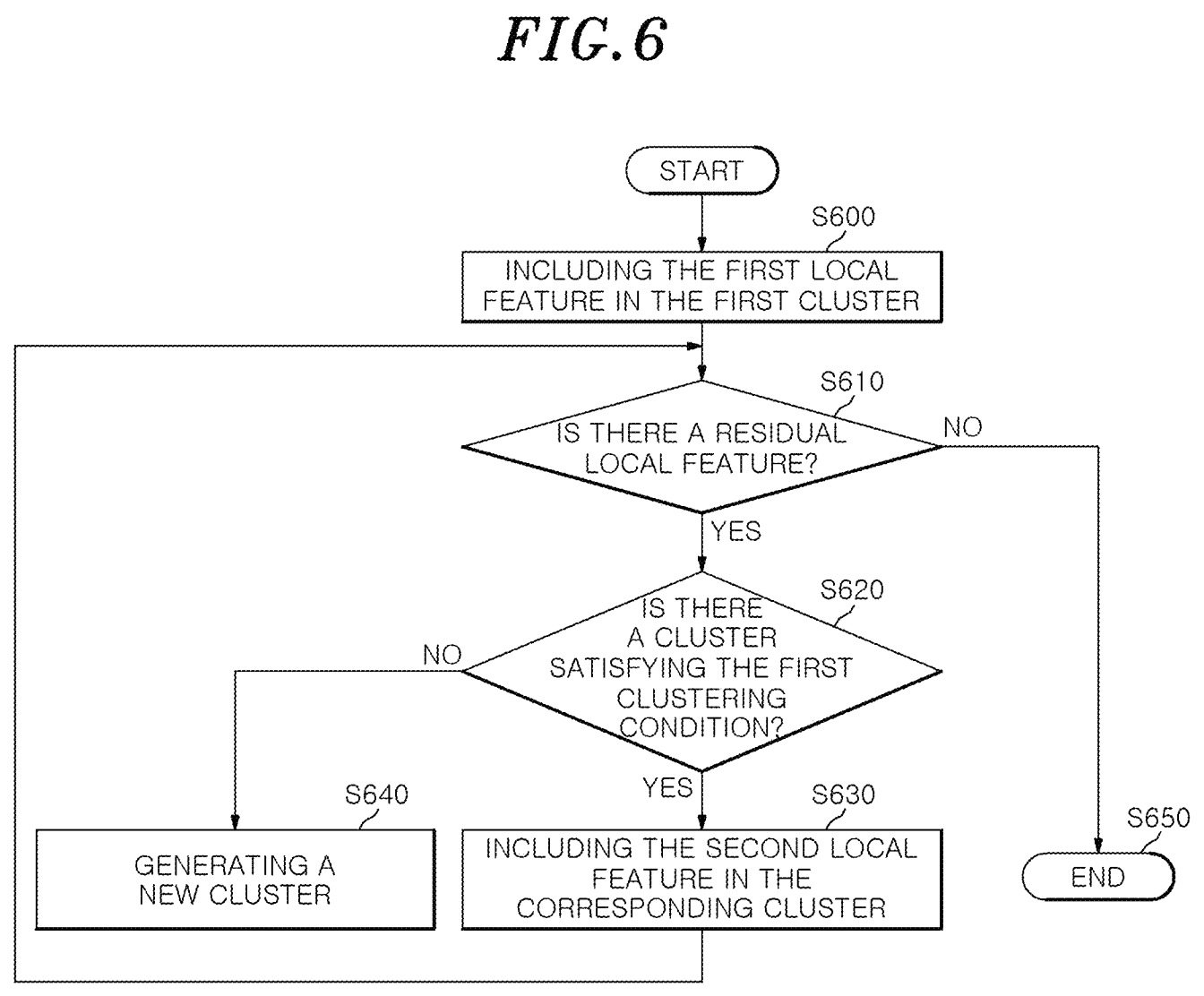

START

S600 — INCLUDING THE FIRST LOCAL FEATURE IN THE FIRST CLUSTER

S610 — IS THERE A RESIDUAL LOCAL FEATURE?

NO → S650 — END

YES

S620 — IS THERE A CLUSTER SATISFYING THE FIRST CLUSTERING CONDITION?

YES → S630 — INCLUDING THE SECOND LOCAL FEATURE IN THE CORRESPONDING CLUSTER

NO → S640 — GENERATING A NEW CLUSTER

*FIG.8*

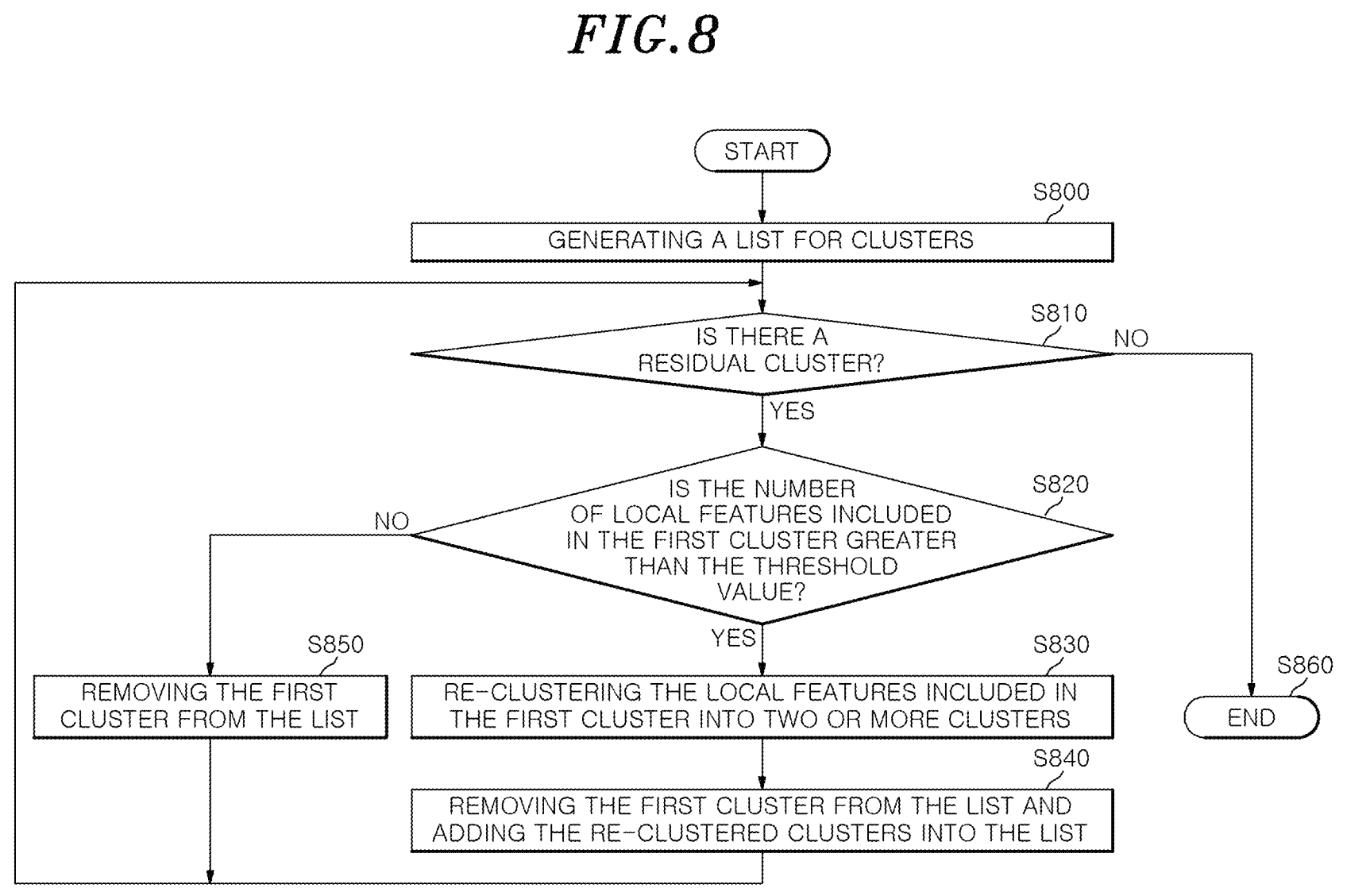

START

S800 GENERATING A LIST FOR CLUSTERS

S810 IS THERE A RESIDUAL CLUSTER?

NO → S860 END

YES

S820 IS THE NUMBER OF LOCAL FEATURES INCLUDED IN THE FIRST CLUSTER GREATER THAN THE THRESHOLD VALUE?

YES

S830 RE-CLUSTERING THE LOCAL FEATURES INCLUDED IN THE FIRST CLUSTER INTO TWO OR MORE CLUSTERS

S840 REMOVING THE FIRST CLUSTER FROM THE LIST AND ADDING THE RE-CLUSTERED CLUSTERS INTO THE LIST

NO

S850 REMOVING THE FIRST CLUSTER FROM THE LIST

METHOD FOR CONSTRUCTING POSITIONING DB USING CLUSTERING OF LOCAL FEATURES AND APPARATUS FOR CONSTRUCTING POSITIONING DB

CROSS-REFERENCE TO RELATED APPLICATION

This application claims priority to Korean Patent Application No. 10-2021-0084068, filed on Jun. 28, 2021, which is incorporated herein by reference in its entirety.

TECHNICAL FIELD

The present disclosure relates to a method for constructing a positioning DB using clustering of local features, and to an apparatus for constructing the positioning DB for performing the same.

BACKGROUND

As a method for performing positioning in a shaded area where the GPS signal is weak, radio wave-based positioning, positioning using a camera, positioning using a lidar sensor, and the like have been presented.

Here, the radio wave-based positioning includes a Cell ID method which is a positioning method based on the base station/AP position and the signal strength, a TDoA/AoA method which is a positioning method based on an arrival time difference or an incident angle of the signal, and a Fingerprinting method which is a positioning method based on the signal pattern matching in units of grids.

Among radio wave-based positioning methods, the camera-based positioning has relatively high positioning accuracy, but has disadvantages in that a 3D map with a large amount of computation for positioning and with a large amount of data should be constructed in advance.

Therefore, in order to more easily use the camera-based positioning with high positioning accuracy, to reduction of the data capacity of the 3D map is inevitably need.

SUMMARY

The problem to be solved by the present disclosure is to provide a method of reducing the size of a positioning DB by constructing the positioning DB using clustering of local features.

In accordance with an aspect of the present disclosure, there is provided a method for constructing a positioning DB performed by an apparatus for constructing the positioning DB, the method comprises: extracting a plurality of local features from a plurality of keyframes capturing a predetermined region; determining an individual 3D keypoint including information on a 3-dimensional position of each of the plurality of local features; clustering the plurality of local features into a plurality of clusters based on the individual 3D keypoint; determining a representative position information representatively indicating a position of each of the plurality of clusters by using the individual 3D keypoint of the local feature included in each of the plurality of clusters; and storing, for each of the plurality of keyframes, an cluster identification for identifying each of the plurality of clusters and the representative position information of each of the plurality of clusters in the positioning DB, wherein each of the local features included in each of the plurality of keyframes corresponds to one of the plurality of clusters.

The clustering of the plurality of local features into the plurality of clusters may comprise clustering local features indicating a point on a same three-dimensional space within the predetermined region among the plurality of local features, based on the individual 3D keypoint of each of the plurality of local features.

The clustering of the plurality of local features into the plurality of clusters may comprise determining, using a 2D keypoint of each of the plurality of local features, the individual 3D keypoint of each of the plurality of local features and a covariance of the individual 3D keypoint; and clustering the plurality of local features into at least one cluster using the covariance of the individual 3D keypoint of each of the plurality of local features.

The method further comprises determining an individual descriptor of each of the plurality of local features, which includes information for distinguishing the plurality of local features.

The representative position information may include a representative 3D keypoint including a 3-dimensional keypoint on each of the plurality of clusters based on the individual 3D keypoint of local features, and a representative descriptor including a descriptor on each of the plurality of clusters based on the individual descriptor of local features.

The clustering of the plurality of local features into the plurality of clusters may comprise if a first cluster among one or more previously generated clusters satisfies a preset clustering condition with respect to a first local feature among the plurality of local features, including the first local feature in the first cluster.

The preset clustering condition may comprise at least one of a distance between an individual 3D keypoint of the first local feature and a representative keypoint of the first cluster, a parallax angle between keyframes corresponding to each of the local features included in the first cluster and a keyframe including the first local feature, and an epipolar distance between local features in the first cluster and the first local feature.

The clustering of the plurality of local features into the plurality of clusters further may comprise for a second local feature among the plurality of local features, if there is no cluster satisfying the preset clustering condition among the one or more previously generated clusters, generating a second cluster including the second local feature.

The clustering of the plurality of local features into the plurality of clusters may comprise clustering the plurality of local features into at least one cluster based on the individual 3D keypoint of each of the plurality of local features; and re-clustering the at least one cluster into the plurality of clusters based on an individual descriptor of each of the plurality of local features.

The re-clustering of the plurality of local features into the plurality of clusters further may comprise re-clustering the at least one cluster into the plurality of clusters based on a result of applying the individual descriptor of each of the plurality of local features to a preset clustering condition.

The preset clustering condition may comprise at least one of a distance between a descriptor of each of the plurality of local features and a representative descriptor of the at least one cluster, and the number of local features included in the at least one cluster.

The re-clustering of the plurality of local features into the plurality of clusters further may comprise generating a list for the at least one cluster; re-clustering the local features included in the first cluster into the plurality of clusters if the local features included in the first cluster among the at least one cluster satisfy the preset clustering condition; and removing the first cluster from the list and adding the plurality of re-clustered clusters into the list.

The positioning DB may comprise a keyframe DB and a cluster DB, a global feature of each of the plurality of keyframes and an ID of a cluster corresponding to each of local features included in each of the plurality of keyframes are stored in the keyframe DB, and the representative 3D keypoint and the representative descriptor of each of the plurality of clusters are stored in the cluster DB.

In accordance with another aspect of the present disclosure, there is provided an apparatus for constructing a positioning DB, the apparatus comprises a memory in which a positioning DB constructing program for generating data to be constructed in the positioning DB is stored; and a processor configured to load the positioning DB constructing program from the memory, wherein the processor is configured to execute the positioning DB constructing program to: extract a plurality of local features from a plurality of keyframes capturing a predetermined region; determine an individual 3D keypoint including information on a 3-dimensional position of each of the plurality of local features; cluster the plurality of local features into a plurality of clusters based on the individual 3D keypoint; determine a representative position information representatively indicating a position of each of the plurality of clusters by using the individual 3D keypoint of the local feature included in each of the plurality of clusters; and store, for each of the plurality of keyframes, an cluster identification for identifying each of the plurality of clusters and the representative position information of each of the plurality of clusters in the positioning DB, wherein each of the local features included in each of the plurality of keyframes corresponds to one of the plurality of clusters.

In accordance with another aspect of the present disclosure, there is provided a non-transitory computer-readable storage medium including computer executable instructions, wherein the instructions, when executed by a processor, cause the processor to perform the method, the method may comprise: clustering a plurality of local features into a plurality of clusters based on an individual 3D keypoint of each of the plurality of local features extracted from a plurality of keyframes that photographed a predetermined region; determining a representative 3D keypoint and a representative descriptor of each of the plurality of clusters by using an individual 3D keypoint and an individual descriptor of local features included in each of the plurality of clusters; and storing, for each of the plurality of keyframes, an ID of a cluster corresponding to each of the local features included in each of the plurality of keyframes, the representative 3D keypoint, and the representative descriptor, in the positioning DB.

According to an embodiment of the present disclosure, since only the representative 3D keypoint and the representative descriptor are stored for each cluster of local features in the positioning DB, the capacity of the DB required for positioning can be saved.

BRIEF DESCRIPTION OF THE DRAWINGS

FIG. 1 is a block diagram illustrating a positioning system according to an embodiment of the present disclosure.

FIG. 2 shows an example of a DB for conventional camera-based positioning,

FIG. 3 shows an example of a positioning DB according to the embodiment of the present disclosure.

FIG. 6 is a flowchart illustrating a method for a local feature clustering unit to cluster local features according to the embodiment of the present disclosure.

FIG. 8 is a flowchart illustrating a method for the descriptor clustering unit to re-cluster local features based on condition 2 among the second clustering condition according to the embodiment of the present disclosure.

DETAILED DESCRIPTION

Figure 4:
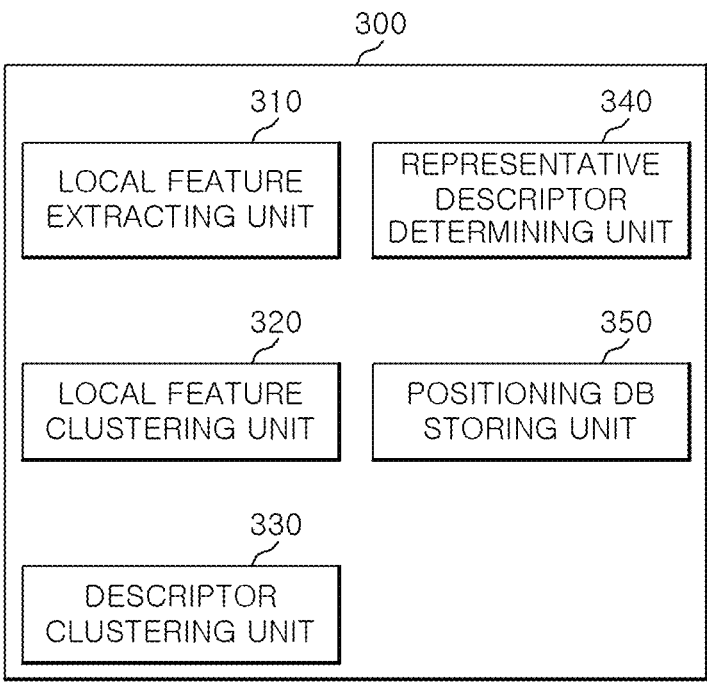
FIG. 4 is a block diagram conceptually illustrating a function of a positioning DB constructing program according to the embodiment of the present disclosure.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

FIG. 1 is a block diagram illustrating a positioning system according to an embodiment of the present disclosure.

Referring to FIG. 1, the positioning system 10 may include a positioning DB 20, a positioning DB constructing apparatus 100, and a positioning device 200.

In this specification, for the convenience of explanation, the positioning system 10 is described to include the positioning DB 20, the positioning DB constructing apparatus 100 and the positioning device 200, but it is not limited thereto.

According to an embodiment, the positioning system 10 may include the positioning DB 20 and the positioning DB constructing apparatus 100, and the positioning system 10 may be a system for constructing the positioning DB 20. Further, according to another embodiment, the positioning system 10 may include the positioning DB 20 and the positioning device 200, and the positioning system 10 may be a system for performing the positioning using a pre-established positioning DB 20.

The positioning DB 20 may store data for the positioning device 200 to determine a position.

In the DB for conventional camera-based positioning, a global feature for each keyframe, at least one local feature, a descriptor for each of the at least one local feature, and the 3D coordinates for each of the at least one local feature can be stored.

Figure 2:
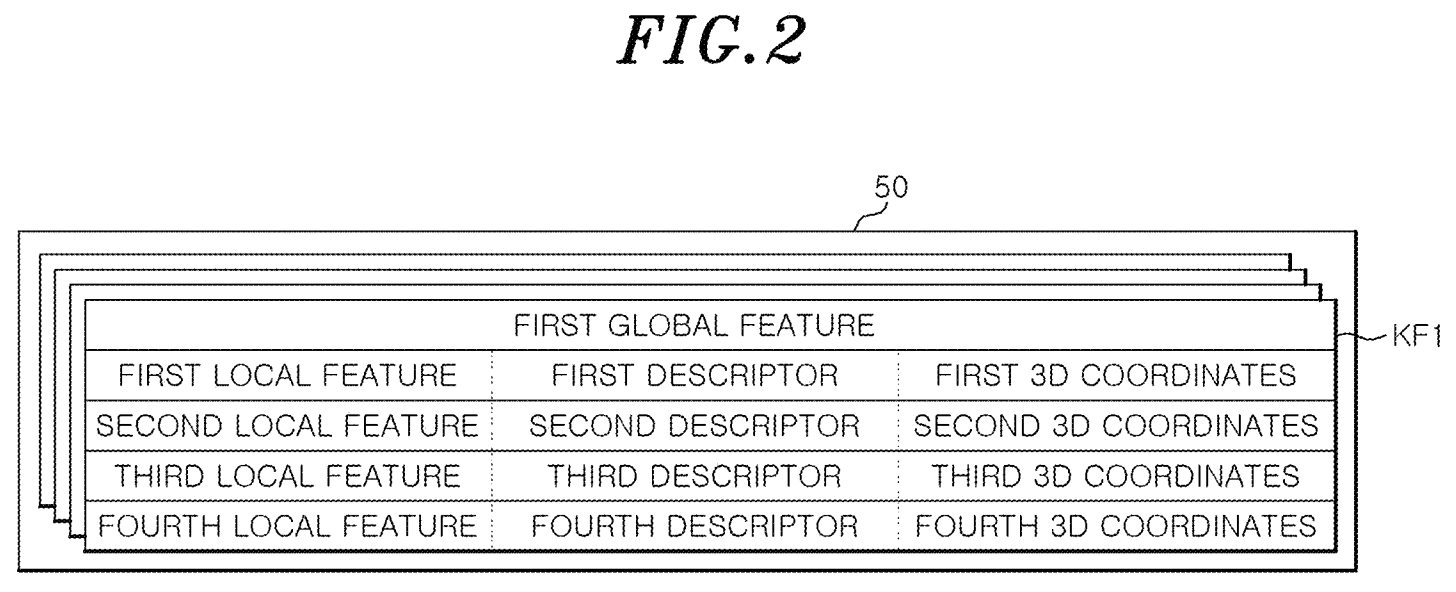

For example, referring further to FIG. 2, FIG. 2 shows an example of a DB for conventional camera-based positioning.

If the global feature of the first keyframe KF1 is the first global feature, and the first keyframe KF1 includes the first local feature, the second local feature, the third local feature and the fourth local feature, in the DB 50 for conventional camera-based positioning, a first global feature as a global feature for the first keyframe KF1 may be stored. Also, a first local feature, a second local feature, a third local feature and a fourth local feature as local features included in the first keyframe may be stored in the DB 50. Also, a first descriptor, a second descriptor, a third descriptor and a fourth descriptor as descriptors for each of the first local feature, the second local feature, the third local feature and the fourth local feature may be stored in the DB 50. Also, first 3D coordinates, second 3D coordinates, third 3D coordinates and fourth 3D coordinates as 3D coordinates for each of the first local feature, the second local feature, the third local feature and the fourth local feature, may be stored.

On the other hand, in the positioning DB 20 according to the embodiment of the present disclosure a global feature and an ID of at least one cluster for each keyframe may be stored, and a representative 3D keypoint and a representative descriptor may be mapped for each ID of the cluster.

Accordingly, the positioning DB 20 according to the embodiment of the present disclosure may include a keyframe DB (not shown) in which the global feature for each keyframe and the ID of at least one cluster are stored, and a cluster DB (not shown) in which a representative 3D keypoint and a representative descriptor for each ID of the cluster are stored.

For example, referring further to FIG. 3, FIG. 3 shows an example of the positioning DB according to the embodiment of the present disclosure.

The positioning DB 20 may include a keyframe DB 22 and a cluster DB 24.

In the keyframe DB 22, for each keyframe, the global feature of each keyframe and IDs of clusters included in each keyframe may be stored.

The global feature of the second keyframe KF2 is the second global feature, and if the first cluster, the third cluster, and the sixth cluster are included in the second keyframe KF2, for the keyframe KF2, the keyframe DB 22 may store the second global feature as the global feature, and may store the ID of the first cluster, the ID of the third cluster and the ID of the sixth cluster as the IDs of the clusters included in the second keyframe KF2.

In the cluster DB 24, representative 3D keypoints and representative descriptors for all clusters included in keyframes used for camera-based positioning may be stored.

If the first cluster, the second cluster, the third cluster, the fourth cluster, the fifth cluster and the sixth cluster are included in the keyframes used for camera-based positioning, the cluster DB 24 may store the ID of the first cluster, the ID of the second cluster, the ID of the third cluster, the ID of the fourth cluster, the ID of the fifth cluster and the ID of the sixth cluster, as the IDs of clusters included in the keyframes. Furthermore, the cluster DB 24 may store a first representative 3D keypoint, a second representative 3D keypoint, a third representative 3D keypoint, a fourth representative 3D keypoint, a fifth representative 3D keypoint and a sixth representative 3D keypoint, as representative 3D keypoints for each of the first cluster, the second cluster, the third cluster, the fourth cluster, the fifth cluster and the sixth cluster Furthermore, the cluster DB 24 may store a first representative descriptor, a second representative descriptor, a third representative descriptor, a fourth representative descriptor, a fifth representative descriptor and a sixth representative descriptor, as representative descriptors for each of the first cluster, the second cluster, the third cluster, the fourth cluster, the fifth cluster and the sixth cluster.

In this way, as compared with the conventional DB for camera-based positioning, since local features and descriptors for local features are not stored for each keyframe in the positioning DB 20 according to the embodiment of the present invention, it is advantageous that the DB storage space can be saved.

The positioning DB constructing apparatus 100 may store data used for the positioning device 200 to determine its own location in the positioning DB 20.

The positioning DB constructing apparatus 100 may determine the global feature for each keyframe that photographed the location where the positioning DB 20 is to be constructed, and may determine the representative 3D keypoint and the representative descriptor for each ID of at least one cluster included in the keyframe.

To this end, the positioning DB constructing apparatus 100 may include a processor 110, a transceiver 120, and a memory 130.

The processor 110 may control the overall operation of the positioning DB constructing apparatus 100.

The processor 110 may transmit data for constructing the positioning DB 20 to the positioning DB 20 using the transceiver 120.

In this specification, the positioning DB constructing apparatus 100 is described as a separate device distinguished from the positioning DB 20, but it is not limited thereto. That is, according to an embodiment, the positioning DB constructing apparatus 100 may include the positioning DB 20, and in this case, data for constructing the positioning DB 20 through internal signaling can be sent to the positioning DB 20.

The positioning DB constructing apparatus 100 may receive a keyframe that photographed a location where the positioning DB 20 is to be constructed, by using the transceiver 120.

Alternatively, according to an embodiment, the positioning DB constructing apparatus 100 may further include a camera (not shown), and the positioning DB constructing apparatus 100 may photograph a keyframe using the camera.

The memory 130 may store the positioning DB constructing program 300 and information required for the execution of the positioning DB constructing program 300.

In this specification, the positioning DB constructing program 300 may refer to a software including commands programmed to generate data for constructing the positioning DB 20.

The processor 110 may load the positioning DB constructing program 300 and information required for the execution of the positioning DB constructing program 300 from the memory 130 in order to execute the positioning DB constructing program 300.

The processor 110 may generate data for constructing the positioning DB 20 using the keyframe that photographed the location where the positioning DB 20 is to be constructed, by executing the positioning DB constructing program 300.

The function and/or the operation of the positioning DB constructing program 300 will be described in detail with reference to FIG. 2.

Also, the positioning device 200 may determine its own location by using data stored in the positioning DB 20.

To this end, the positioning device 200 may include a processor 210, a transceiver 220, and a memory 230.

The processor 210 may control the overall operation of the positioning device 200.

The processor 210 may receive data for determining the location of the positioning device 200 from the positioning DB 20 using the transceiver 220.

The memory 230 may store the positioning program 240 including commands programmed to determine the location of the positioning device 200 and information required for the execution of the positioning program 240.

The processor 210 may load the positioning program 240 and information required for the execution of the positioning program 240 from the memory 230 in order to execute the positioning program 240.

The processor 210 may determine its own location by executing the positioning program 240.

To this end, according to an embodiment, the positioning device 200 may further include a camera (not shown). That is, the positioning device 200 may extract global features and local features from an image captured by using a camera (not shown), compare the global features of the captured image with global features of keyframes stored in the positioning DB 20, and select similar keyframes. Thereafter, the positioning device 200 may compare local features and descriptors extracted from the captured image with the representative 3D keypoint and the representative descriptor of each of the clusters included in the selected keyframes, and determine its own location.

FIG. 4 is a block diagram conceptually illustrating a function of the positioning DB constructing program according to the embodiment of the present disclosure.

Referring to FIG. 1 and FIG. 4, the positioning DB constructing program 300 may include a local feature extracting unit 310, a local feature clustering unit 320, a descriptor clustering unit 330, a representative descriptor determining unit 340 and a positioning DB storing unit 350.

The local feature extracting unit 310, the local feature clustering unit 320, the descriptor clustering unit 330, the representative descriptor determining unit 340 and the positioning DB storing unit 350 shown in FIG. 4 are shown as a conceptual division of the functions of the positioning DB construction program 300 in order to easily explain the functions of the positioning DB constructing program 300, but it is not limited thereto. According to embodiments, the functions of the local feature extracting unit 310, the local feature clustering unit 320, the descriptor clustering unit 330, the representative descriptor determining unit 340 and the location DB storing unit 350 may be merged/separated, and may be implemented as a series of commands included in one program.

The local feature extracting unit 310 may extract a plurality of local features from a keyframe obtained by using the transceiver 120 or the camera (not shown).

The local feature may include a 2D keypoint and a separate descriptor. The 2D keypoint may refer to two-dimensional coordinates on the keyframe of the local feature. Also, the individual descriptor is for distinguishing the local feature from other local features included in the keyframe, and may refer to a multidimensional vector in which the correlation between the local feature and the pixels surrounding the local feature is expressed as a vector.

According to an embodiment, the local feature extracting unit 310 may include a neural network that pre-learned to extract local features from the keyframe, and the local feature extracting unit 310 may output the local features by inputting the keyframe into the neural network.

Alternatively, according to an embodiment, the local feature extracting unit 310 may extract a plurality of local features from the keyframe using a method such as Super-Point, R2D2, SIFT, or the like.

The local feature clustering unit 320 may cluster local features that indicate a point on the same three-dimensional space within the specific region from among local features included in each of the plurality of keyframes, and may determine the representative 3D keypoint of the local feature cluster.

Here, the plurality of keyframes may refer to images obtained by photographing the same region at different locations, and the 3D keypoint may refer to three-dimensional coordinates (e.g., absolute coordinates) of a three-dimensional space within the specific region.

First, the local feature clustering unit 320 may cluster local features that indicate a point on the same three-dimensional space from among local features included in each of the plurality of keyframes, based on individual 3D keypoints of the local features included in each of the plurality of keyframes.

More specifically, the local feature clustering unit 320 may compare individual 3D keypoints of local features included in each of a plurality of keyframes, and may cluster the local features with a distance between the individual 3D keypoints equal to or less than a preset reference range as one cluster.

To this end, the local feature clustering unit 320 may determine the individual 3D keypoint for each of the local features in the plurality of keyframes, by using 2D keypoints of local features included in the plurality of keyframes and pose information of the plurality of keyframes. The pose information may include the absolute position and direction of the camera that photographed the keyframe, and may be expressed using 6-degree of freedom (DOF).

According to an embodiment, if pose information of a plurality of keyframes is not determined, the local feature clustering unit 320 may determine relative pose information of the plurality of keyframes, by using matching between 2D keypoints of local features included in the plurality of keyframes and the plurality of keyframes.

The local feature clustering unit 320 may determine individual 3D keypoints of the local features included in the plurality of keyframes, by using the 3D direction vector converted from the 2D keypoint, intrinsic information of the camera, and the relative pose information of the plurality of keyframes. For example, the local feature clustering unit 320 may determine relative pose information of the plurality of keyframes using a structure-from-motion (SfM) method.

That is, if the local feature clustering unit 320 calculates the 3D keypoint of each local feature by using the 2D keypoints of the local features included in the plurality of keyframes, pose information of keyframes may be generated differently depending on the types or settings, etc. of the camera that photographed the keyframe. Accordingly, the local feature clustering unit 320 may calculate the 3D keypoint of each local feature by using instinct information of the camera in order to correct the difference for each camera.

According to another embodiment, if the pose information of the plurality of keyframes is predetermined, the local feature clustering unit 320 may determine the individual 3D keypoint of each local feature using the predetermined pose information of the plurality of keyframes.

For example, if the plurality of keyframes are photographed using the LiDAR sensor and the camera together, the local feature clustering unit 320 may obtain pose information of the camera through a Simultaneous Localization and Mapping (SLAM) technique, and may determine individual 3D keypoints of local features using the pose information of the camera and a 3D point cloud.

The local feature clustering unit 320 may calculate a covariance of individual 3D keypoints using 2D keypoints of local features in order to calculate a distance between individual 3D keypoints.

Figure 5:
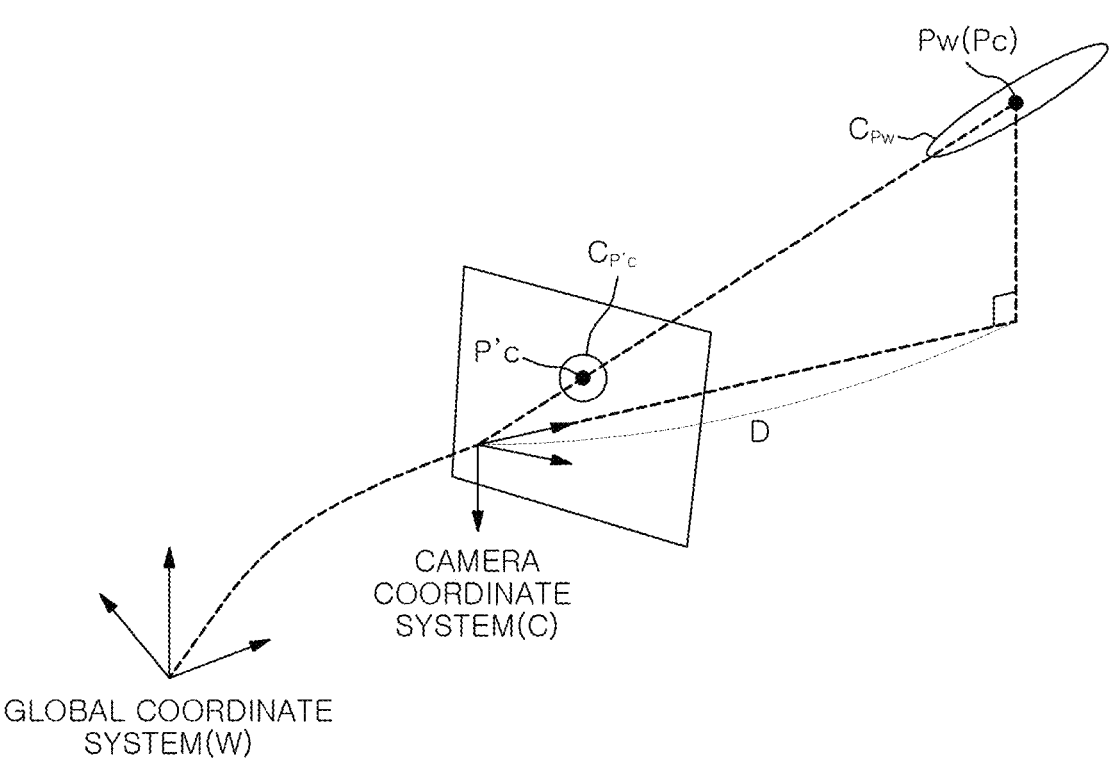
FIG. 5 illustrates a method for determining a covariance of 3D keypoints of local features according to the embodiment of the present disclosure.

Referring further to FIG. 5, the local feature clustering unit 320 may determine a projection point Pc obtained by projecting a 2D keypoint P'c of a local feature by a depth D using the 2D keypoint P'c of the local feature and the depth D of the 2D keypoint P'c in a three-dimensional space W.

The local feature clustering unit 320 may determine individual 3D keypoints Pw of local features by applying a World-to-Camera (W2C) transformation (e.g., $R_{w2c}$, $t_{w2c}$, . . . , etc.) that transforms the global coordinate system into a camera coordinate system to the projection point Pc.

Here, the projection point Pc and the individual 3D keypoint Pw may indicate the same point. The projection point Pc may refer to coordinates expressed in the camera coordinate system, and the individual 3D keypoint Pw may refer to coordinates expressed in the global coordinate system.

Thereafter, the local feature clustering unit 320 may determine the covariance $C_{pc}$ of the projection point Pc by using the depth D of the 2D keypoint P'c, the variance $\sigma D^2$ for the depth D of the local feature, the 2D keypoint P'c of the local feature, and the covariance $C_{pc}$ of the 2D keypoint P'c of the local feature.

The local feature clustering unit 320 may determine the covariance $C_{pw}$ of the individual 3D keypoint Pw by using the W2C transform $R_{w2C}$ value and the covariance $C_{pc}$ of the projection point Pc.

For example, the local feature clustering unit 320 may determine the covariance $C_{pw}$ of the individual 3D keypoint Pw by applying Equation 1 below.

$$P'_c = \begin{bmatrix} u \\ v \\ 1 \end{bmatrix}$$ [Equation 1]

$$P_c = D \cdot \begin{bmatrix} u \\ v \\ 1 \end{bmatrix}$$

$$P_w = R_{W2C} \cdot P_c + t_{W2C} \cdot P_c + t_{W2C}$$

$$C_{P_c} = D^2 \cdot C_{P'_c} + \sigma_D^2 \cdot P'_c \cdot P'^T_c$$

$$C_{P_w} = R_{W2C} \cdot C_{P_c} \cdot R^T_{W2C}$$

Here, u may refer to the x-coordinate value of the 2D keypoint P'c of the local feature, and v may refer to the y-coordinate value of the 2D keypoint P'c of the local feature.

Referring further to FIG. 6, FIG. 6 is a flowchart illustrating a method for the local feature clustering unit 320 to cluster local features.

In order to sequentially cluster all local features included in the plurality of keyframes, the local feature clustering unit 320 may include a first keyframe, which is a first keyframe for performing clustering, in the first cluster (S600).

Thereafter, the local feature clustering unit 320 may determine whether there is a residual local feature that has not been clustered (S610). If there is a second local feature that has not been clustered ('Yes' in S610), with respect to the second local feature to be determined, the local feature clustering unit 320 may determine whether there exists a cluster satisfying a predetermined first clustering condition among previously generated clusters (S620).

The first clustering condition may include the following conditions 1 to 3.

Condition 1: The distance between the common 3D keypoint of the cluster and the 3D keypoint of the second local feature to be determined is equal to or less than a threshold value.

Condition 2: The parallax angle of the keyframes in the cluster and the keyframe including the second local feature is equal to or less than a threshold value.

Condition 3: An epipolar distance between local features in the cluster and the second local feature is less than or equal to a threshold value.

According to an embodiment, the distance of condition 1 is Mahalanobis Distance, and may be calculated as Equation 2 below.

Mahalanobis Distance $= (P1-P2)^T \times inv(\text{Cov}1+\text{Cov}2) \times$ 
$(P1-P2)$ [Equation 2]

Here, P1 may refer to the common 3D keypoint of the cluster, P2 may refer to the 3D keypoint of the second local feature, Cov1 may refer to the covariance of the common 3D keypoint of the cluster, and Cov2 may refer to the covariance of the second local feature.

According to an embodiment, if the second local feature does not satisfy any one of the conditions 1 to 3 for the cluster, the local feature clustering unit 320 may determine that the second local feature does not satisfy the first clustering condition without determining whether the other conditions are satisfied.

If there is a cluster satisfying the first clustering condition for the second local feature ('Yes' in S620), the local feature clustering unit 320 may include the second local feature in the corresponding cluster (S630).

On the other hand, if there is no cluster that satisfies the first clustering condition for the second local feature ('No' in S620), the local feature clustering unit 320 may create a new cluster and may include the new cluster in the cluster that generated the second local feature (S640).

If there is no residual local feature ('No' in S610), the local feature clustering unit 320 may end the clustering of the local feature (S650). That is, the local feature clustering unit 320 may repeat the above processes (S610 to S640) until there is no residual local feature to include the local features in the existing cluster or create a new cluster.

The descriptor clustering unit 330 may re-cluster local features included in the same cluster based on individual descriptors of the local features.

This is because that even if local features indicate a point on the same three-dimensional space, individual descriptors of local features may be significantly different if the locations that photographed the keyframes are far from each other, and if the individual descriptors merge different local features, the performance of the merge may be decreased.

Accordingly, the descriptor clustering unit 330 may re-cluster local features that satisfy the second clustering condition among local features included in the same cluster.

The second clustering condition may be one of the following three conditions.

Condition 1: The distance between the individual descriptor of the local feature and the representative descriptor of the cluster is equal to or less than a threshold value (or less than the threshold value).

Condition 2: The number of local features included in the cluster is equal to or less than a reference value (or less than the reference value).

Condition 3: The distance from the representative descriptor of the cluster is equal to or less than a threshold value (or less than the threshold value), and the number of local features included in the cluster is equal to or less than a reference value (or less than the reference value).

Here, the representative descriptor is a descriptor indicating a cluster including local features, and according to an embodiment, the representative descriptor may be an average of the clusters of the local features.

Hereinafter, a method that the descriptor clustering unit 330 re-clusters the local features based on any one of conditions 1 to 3 of the second clustering condition will be described.

Figure 7:
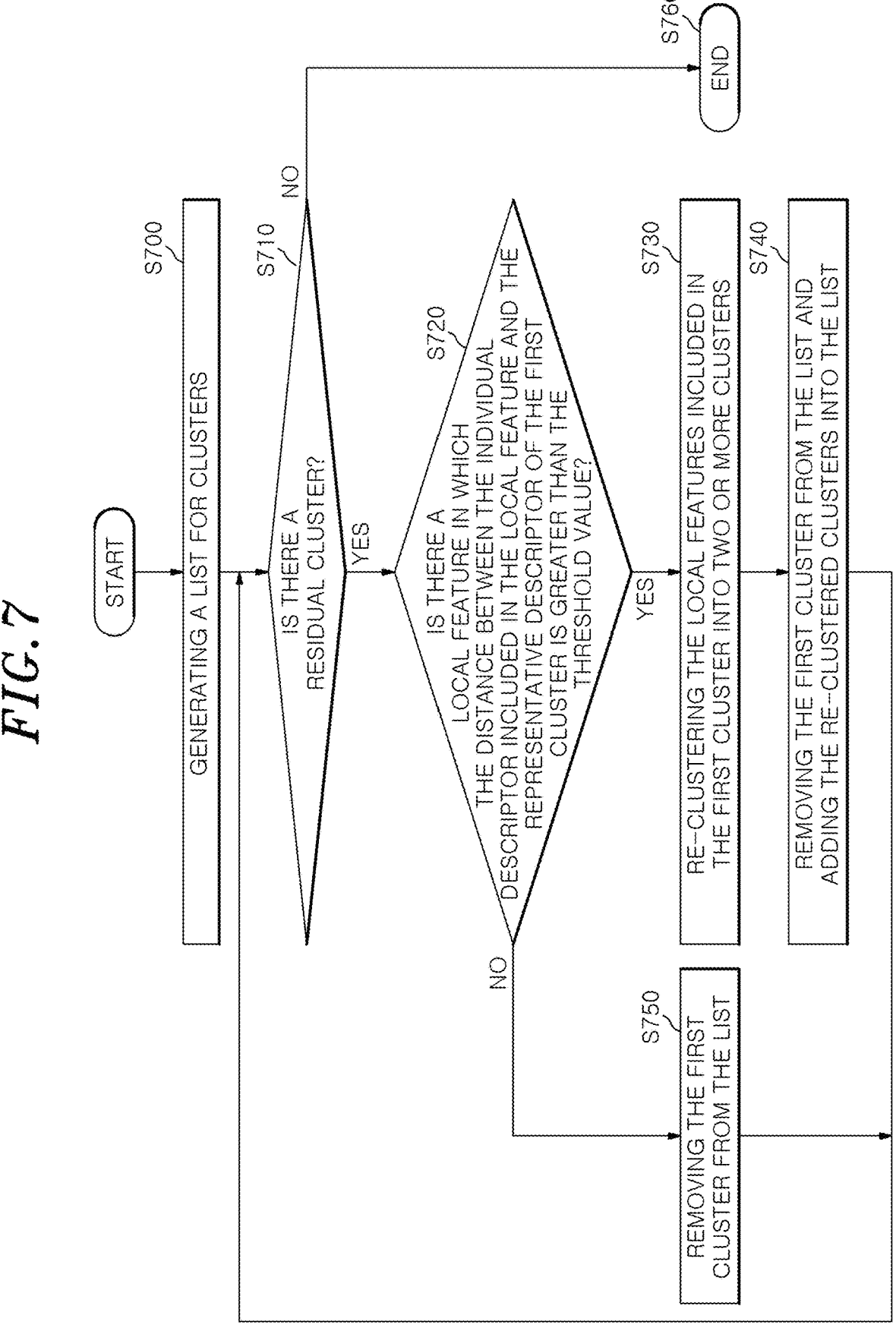
FIG. 7 is a flowchart illustrating a method for a descriptor clustering unit to re-cluster local features based on condition 1 among second clustering condition according to the embodiment of the present disclosure.

First, referring further to FIG. 7, FIG. 7 is a flowchart illustrating a method for a descriptor clustering unit to re-cluster local features based on condition 1 among the second clustering condition.

The descriptor clustering unit 330 may generate a list of clusters generated by the local feature clustering unit 320 in order to re-cluster the local features (S700).

The descriptor clustering unit 330 may determine whether a residual cluster exists in the generated list (S710). If the first cluster exists as the residual cluster ('Yes' in S710), the descriptor clustering unit 330 may determine whether the first cluster satisfies the first condition among the second clustering condition (S720).

That is, the descriptor clustering unit 330 may re-cluster local features in which the distance between the individual descriptor of the local feature and the representative descriptor of the first cluster is greater than (or equal to or greater than) the reference value from among the local features included in the first cluster.

Among the local features included in the first cluster, if there are local features in which the distance between the individual descriptor of the local feature and the representative descriptor of the first cluster is greater than (or equal to or greater than) the reference value ('Yes' in S720), the descriptor clustering unit 330 may re-cluster the local features included in the first cluster into two or more clusters (S730).

According to an embodiment, the descriptor clustering unit 330 may re-cluster the local features included in the first cluster into two or more clusters using a k-means clustering algorithm.

Alternatively, according to an embodiment, the descriptor clustering unit 330 may re-cluster local features in which the distance between the individual descriptor and the representative descriptor is equal to or less than (or less than) the reference value among local features included in the first cluster into a second cluster, and may re-cluster local features in which the distance between the individual descriptor and the representative descriptor of the cluster is greater than (or equal to or greater than) the reference value into a third cluster.

Thereafter, the descriptor clustering unit 330 may remove the first cluster from the list and add the re-clustered clusters to the list (S740).

However, according to an embodiment, if local features having the distance between the individual descriptor and the representative descriptor equal to or less than (or less than) the reference value are re-clustered into the second cluster, and local features having the distance between the individual descriptor and the representative descriptor of the cluster greater than (or equal to or greater than) the reference value are re-clustered into the third cluster, the descriptor clustering unit 330 may add only the third cluster to the list without adding the second cluster to the list.

On the other hand, if the distance between the individual descriptor of the local features included in the first cluster and the representative descriptor of the first cluster is equal to or less than (or less than) the reference value (No' in S720), the descriptor clustering unit 330 may remove the first cluster from the list (S750).

If there is no residual cluster ('No' in S710), the descriptor clustering unit 330 may end the re-clustering of local features (S760). That is, the descriptor clustering unit 330 may re-cluster local features by repeating the above processes (S710 to S750) until there is no residual cluster.

Also, referring further to FIG. 8, FIG. 8 is a flowchart illustrating a method for the descriptor clustering unit 330 to re-cluster local features based on condition 2 among the second clustering condition.

The descriptor clustering unit 330 may generate a list of clusters generated by the local feature clustering unit 320 in order to re-cluster local features (S800).

The descriptor clustering unit 330 may determine whether a residual cluster exists in the generated list (S810), and if the first cluster exists as the residual cluster ('Yes' in S810), the descriptor clustering unit 330 may determine whether the first cluster satisfies condition 2 among the second clustering condition.

If the number of local features included in the first cluster is greater than (or equal to or greater than) the threshold value ('Yes' in S820), the descriptor clustering unit 330 may re-cluster the local features included in the first cluster into two or more clusters (S830). According to an embodiment, the descriptor clustering unit 330 may re-cluster local features included in the first cluster into two or more clusters using a k-means clustering algorithm.

Thereafter, the descriptor clustering unit 330 may remove the first cluster from the list and add the re-clustered clusters to the list (S840).

On the other hand, if the number of local features included in the first cluster is equal to or less than the threshold value ('No' in S820), the descriptor clustering unit 330 may remove the first cluster from the list (S850).

If there is no residual cluster ('No' in S810), the descriptor clustering unit 330 may end the re-clustering of local features (S860). That is, the descriptor clustering unit 330 may re-cluster local features by repeating the above processes (S810 to S850) until there is no residual cluster.

Figure 9:
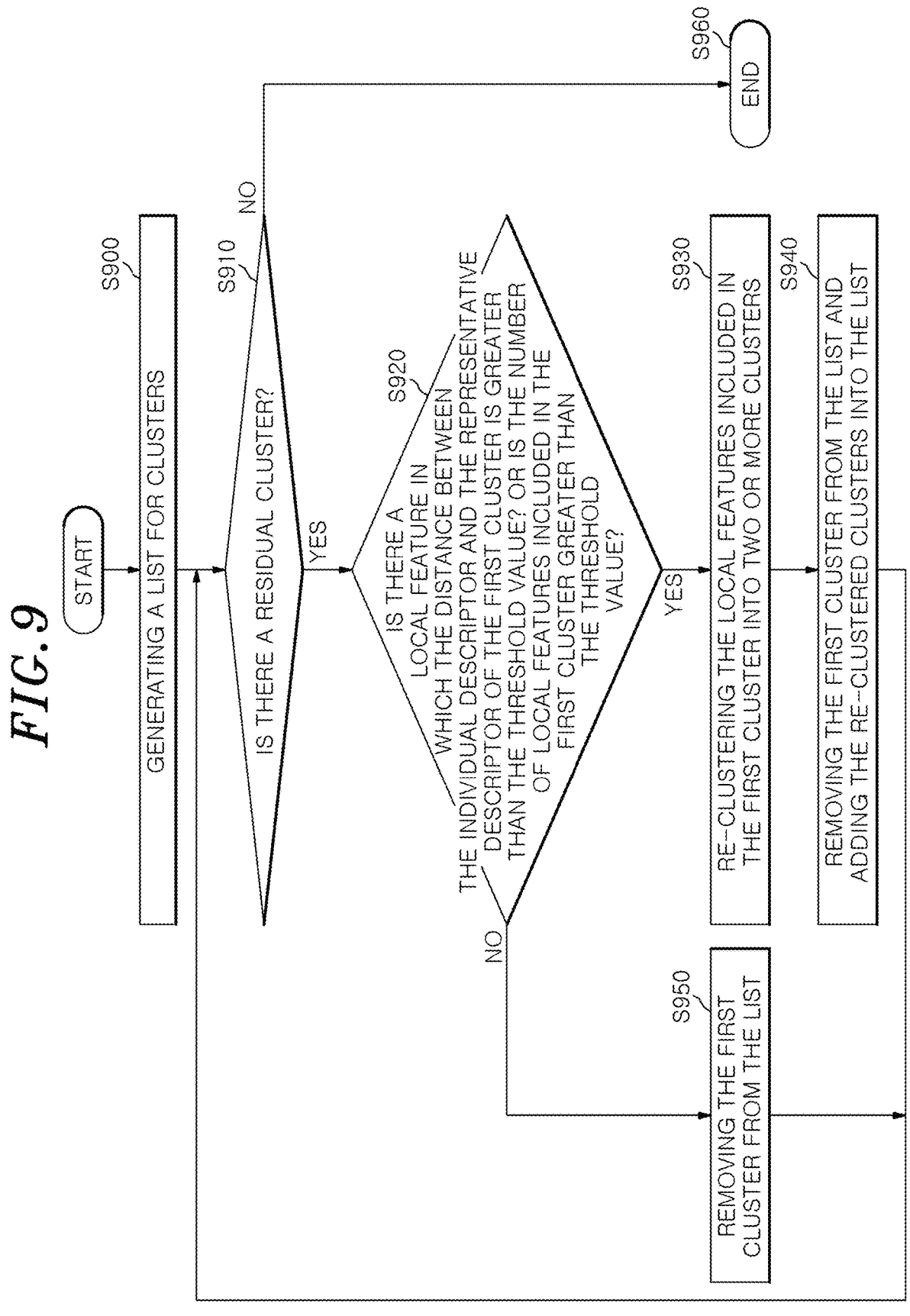
FIG. 9 is a flowchart illustrating a method for the descriptor clustering unit to re-cluster local features based on condition 3 among the second clustering condition according to the embodiment of the present disclosure.

Finally, referring further to FIG. 9, FIG. 9 is a flowchart illustrating a method for the descriptor clustering unit 330 to re-cluster local features based on condition 3 among the second clustering condition.

The descriptor clustering unit 330 may generate a list of clusters generated by the local feature clustering unit 320 in order to re-cluster local features (S900).

The descriptor clustering unit 330 may determine whether a residual cluster exists in the generated list (S910), and if the first cluster exists as the residual cluster ('Yes' in S910), the descriptor clustering unit 330 may determine whether the first cluster satisfies condition 3 among the second clustering condition.

If there is a local feature in which the distance between the individual descriptor and the representative descriptor of the first cluster is greater than a threshold value, or if the number of local features included in the first cluster is greater than a threshold value ('Yes' in S920), the descriptor clustering unit 330 may re-cluster the local features included in the first cluster into two or more clusters (S930).

According to an embodiment, the descriptor clustering unit 330 may re-cluster local features included in the first cluster into two or more clusters using a k-means clustering algorithm.

Thereafter, the descriptor clustering unit 330 may remove the first cluster from the list and add the re-clustered dusters to the list (S940).

On the other hand, if the number of local features included in the first cluster is equal to or less than (or less than) the threshold value ('No' in S920), the descriptor clustering unit 330 may remove the first cluster from the list (S950).

If there is no residual cluster ('No' in S910), the descriptor clustering unit 330 may end the re-clustering of the local features (S960). That is, the descriptor clustering unit 330 may re-cluster local features by repeating the above processes (S910 to S950) until there is no residual cluster.

As the descriptor clustering unit 330 re-clusters local features, a plurality of clusters may be generated.

The representative descriptor determining unit 340 may determine representative 3D keypoints and representative descriptors of the plurality of clusters generated according to the re-clustering of local features.

The representative descriptor determining unit 340 may determine the representative 3D keypoint of the cluster before the re-clustering as a representative 3D keypoint of the re-clustered clusters.

That is, if the first cluster is divided into the second cluster and the third cluster according to the re-clustering of the descriptor clustering unit 330, the representative 3D keypoint of the first cluster may be determined as the representative 3D keypoint of the second cluster and the representative 3D keypoint of the third cluster.

Also, the representative descriptor determiner 340 may determine the representative descriptor of the re-clustered cluster by merging individual descriptors of local features included in the re-clustered cluster.

According to an embodiment, the representative descriptor determining unit 340 may determine an average of individual descriptors of local features included in the re-clustered cluster as the representative descriptor of the re-clustered cluster.

Alternatively, according to another embodiment, the representative descriptor determining unit 340 may calculate an average value of individual descriptors of local features included in the re-clustered cluster, and may determine the closest descriptor to an average value among individual descriptors of local features included in the re-clustered cluster as the representative descriptor of the re-clustered cluster.

The positioning DB storing unit 350 may store the representative 3D keypoint and the representative descriptor of the re-clustered cluster determined by the representative descriptor determining unit 340 in the positioning DB 20.

That is, the positioning DB storing unit 350 may store, for each keyframe, the global feature of the keyframe and the ID of the cluster corresponding to each of the local features included in the keyframe for each keyframe, and may store the representative 3D keypoint and the representative descriptor for each cluster.

In the conventional case, since the global feature of the keyframe, the plurality of local features, and the descriptors of the plurality of local features are all stored in the DB for each keyframe, considerable DB capacity was required for the positioning. However, according to the embodiments of the present invention, since the representative 3D keypoint and representative descriptor are stored in the positioning DB 20 for each cluster, the DB capacity required for the positioning can be saved.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A computer-implemented method for constructing a positioning database (DB) performed by an apparatus for constructing the positioning DB, the method comprising:

extracting a plurality of local features from a plurality of keyframes capturing a predetermined region by executing a neural network on one or more processors, the plurality of keyframes captured using a light detection and ranging (LiDAR) sensor and a camera;

determining, by the one or more processors, an individual 3D keypoint including information on a 3-dimensional position of each of the plurality of local features;

clustering the plurality of local features into a plurality of clusters to reduce a size of the positioning DB for storing in a memory by at least:

determining a 2D keypoint indicating a position of each of the plurality of local features, determining the individual 3D keypoint of each of the plurality of local features and a covariance of the individual 3D keypoint using the 2D keypoint of each of the plurality of local features, and clustering the plurality of local features into the plurality of clusters using the covariance of the individual 3D keypoint of each of the plurality of local features;

determining a representative position information representatively indicating a position of each of the plurality of clusters by using the individual 3D keypoint of the local feature included in each of the plurality of clusters; and storing, for each of the plurality of keyframes, cluster identification for identifying each of the plurality of clusters and the representative position information of each of the plurality of clusters in the positioning DB, wherein each of the local features included in each of the plurality of keyframes corresponds to one of the plurality of clusters.

2. The method of claim 1, wherein the clustering of the plurality of local features into the plurality of clusters comprises:

clustering local features indicating a same point on a three-dimensional space within the predetermined region among the plurality of local features, based on the individual 3D keypoint of each of the plurality of local features.

3. The method of claim 1, further comprises:

determining an individual descriptor of each of the plurality of local features, which includes information for distinguishing the plurality of local features.

4. The method of claim 1, wherein the representative position information comprises:

a representative 3D keypoint including a 3-dimensional keypoint on each of the plurality of clusters based on the individual 3D keypoint of local features, and a representative descriptor including a descriptor on each of the plurality of clusters based on the individual descriptor of local features.

5. The method of claim 1, wherein the clustering of the plurality of local features into the plurality of clusters comprises:

if a first cluster among one or more previously generated clusters satisfies a preset clustering condition with respect to a first local feature among the plurality of local features, including a first local feature in the first cluster feature for the first local feature among the plurality of local features, and wherein the preset clustering condition comprises at least one of a distance between an individual 3D keypoint of the first local feature and a representative keypoint of the first cluster, a parallax angle between keyframes corresponding to each of the local features included in the first cluster and a keyframe including the first local feature, and an epipolar distance between local features in the first cluster and the first local feature.

6. The method of claim 5, wherein the clustering of the plurality of local features into the plurality of clusters further comprises:

if there is no cluster satisfying the preset clustering condition among the one or more previously generated clusters, generating a second cluster including a second local feature for the second local feature among the plurality of local features.

7. The method of claim 4, wherein the clustering of the plurality of local features into the plurality of clusters comprises:

clustering the plurality of local features into at least one cluster based on the individual 3D keypoint of each of the plurality of local features; and re-clustering the at least one cluster into the plurality of clusters based on the individual descriptor of each of the plurality of local features.

8. The method of claim 7, wherein the re-clustering of the plurality of local features into the plurality of clusters further comprises:

re-clustering the at least one cluster into the plurality of clusters based on a result of applying the individual descriptor of each of the plurality of local features to a preset clustering condition, and wherein the preset clustering condition comprises at least one of a distance between a descriptor of each of the plurality of local features and the representative descriptor of the at least one cluster, and the number of local features included in the at least one cluster.

9. The method of claim 8, wherein the re-clustering of the plurality of local features into the plurality of clusters further comprises:

generating a list for the at least one cluster;

re-clustering the local features included in a first cluster into the plurality of clusters if the local features included in the first cluster among the at least one cluster satisfy the preset clustering condition; and removing the first cluster from the list and adding the plurality of re-clustered clusters into the list.

10. The method of claim 4, wherein the positioning DB comprises a keyframe DB and a cluster DB, a global feature of each of the plurality of keyframes and an ID of a cluster corresponding to each of local features included in each of the plurality of keyframes are stored in the keyframe DB, and the representative 3D keypoint and the representative descriptor of each of the plurality of clusters are stored in the cluster DB.

11. An apparatus for constructing a positioning database (DB), the apparatus comprising:

a memory in which a positioning DB constructing program for generating data to be constructed in the positioning DB is stored; and a processor configured to load the positioning DB constructing program from the memory, wherein the processor is configured to execute the positioning DB constructing program to:

extract a plurality of local features from a plurality of keyframes capturing a predetermined region by executing a neural network, the plurality of keyframes captured using a light detection and ranging (LiDAR) sensor and a camera;

determine an individual 3D keypoint including information on a 3-dimensional position of each of the plurality of local features;

cluster the plurality of local features into a plurality of clusters to reduce a size of the positioning DB for storing in a memory by at least:

determining a 2D keypoint indicating a position of each of the plurality of local features, determining the individual 3D keypoint of each of the plurality of local features and a covariance of the individual 3D keypoint using the 2D keypoint of each of the plurality of local features, and clustering the plurality of local features into the plurality of clusters using the covariance of the individual 3D keypoint of each of the plurality of local features;

determine a representative position information representatively indicating a position of each of the plurality of clusters by using the individual 3D keypoint of the local feature included in each of the plurality of clusters; and store, for each of the plurality of keyframes, cluster identification for identifying each of the plurality of clusters and the representative position information of each of the plurality of clusters in the positioning DB, wherein each of the local features included in each of the plurality of keyframes corresponds to one of the plurality of clusters.

12. The apparatus of claim 11, wherein the processor is configured to cluster local features indicating a same point on a three-dimensional space within the predetermined region among the plurality of local features, based on the individual 3D keypoint of each of the plurality of local features.

13. The apparatus of claim 11, wherein the processor is configured to determine an individual descriptor of each of the plurality of local features, which includes information for distinguishing the plurality of local features.

14. The apparatus of claim 13, wherein the representative position information comprises:

a representative 3D keypoint including a 3-dimensional keypoint on each of the plurality of clusters based on the individual 3D keypoint of local features, and a representative descriptor including a descriptor on each of the plurality of clusters based on the individual descriptor of local features.

15. The apparatus of claim 14, wherein the processor is configured to:

cluster the plurality of local features into at least one cluster based on the individual 3D keypoint of each of the plurality of local features; and re-cluster the at least one cluster into the plurality of clusters based on the individual descriptor of each of the plurality of local features.

16. The apparatus of claim 15, wherein the processor is configured to re-cluster the at least one cluster into the plurality of clusters based on a result of applying the individual descriptor of each of the plurality of local features to a preset clustering condition, and wherein the preset clustering condition comprises at least one of a distance between a descriptor of each of the plurality of local features and the representative descriptor of the at least one cluster, and the number of local features included in the at least one cluster.

17. The apparatus of claim 16, wherein the processor is configured to:

generate a list for the at least one cluster;

re-cluster the local features included in a first cluster into the plurality of clusters if the local features included in the first cluster among the at least one cluster satisfy the preset clustering condition; and remove the first cluster from the list and add the plurality of re-clustered clusters into the list.

18. The apparatus of claim 14, wherein the positioning DB comprises a keyframe DB and a cluster DB, a global feature of each of the plurality of keyframes and an ID of a cluster corresponding to each of local features included in each of the plurality of keyframes are stored in the keyframe DB, and the representative 3D keypoint and the representative descriptor of each of the plurality of clusters are stored in the cluster DB.

* * * * *